April 21, 1942.  H. R. SCHUTZ  2,280,268
APPARATUS FOR MAKING HOLLOW GLASS ARTICLES
Filed July 9, 1938  6 Sheets-Sheet 5
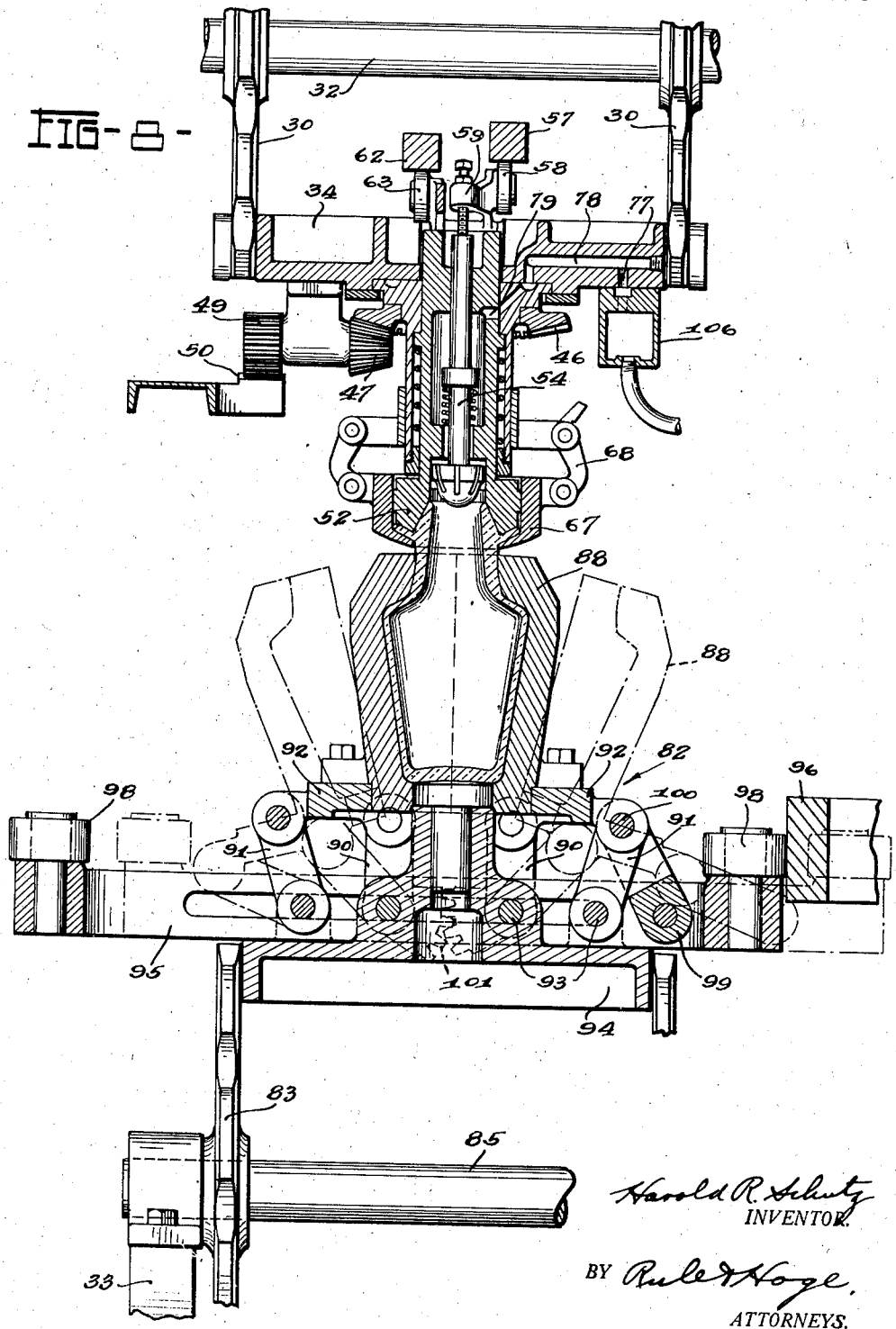
Harold R. Schutz
INVENTOR.
BY Rule & Hoge,
ATTORNEYS.

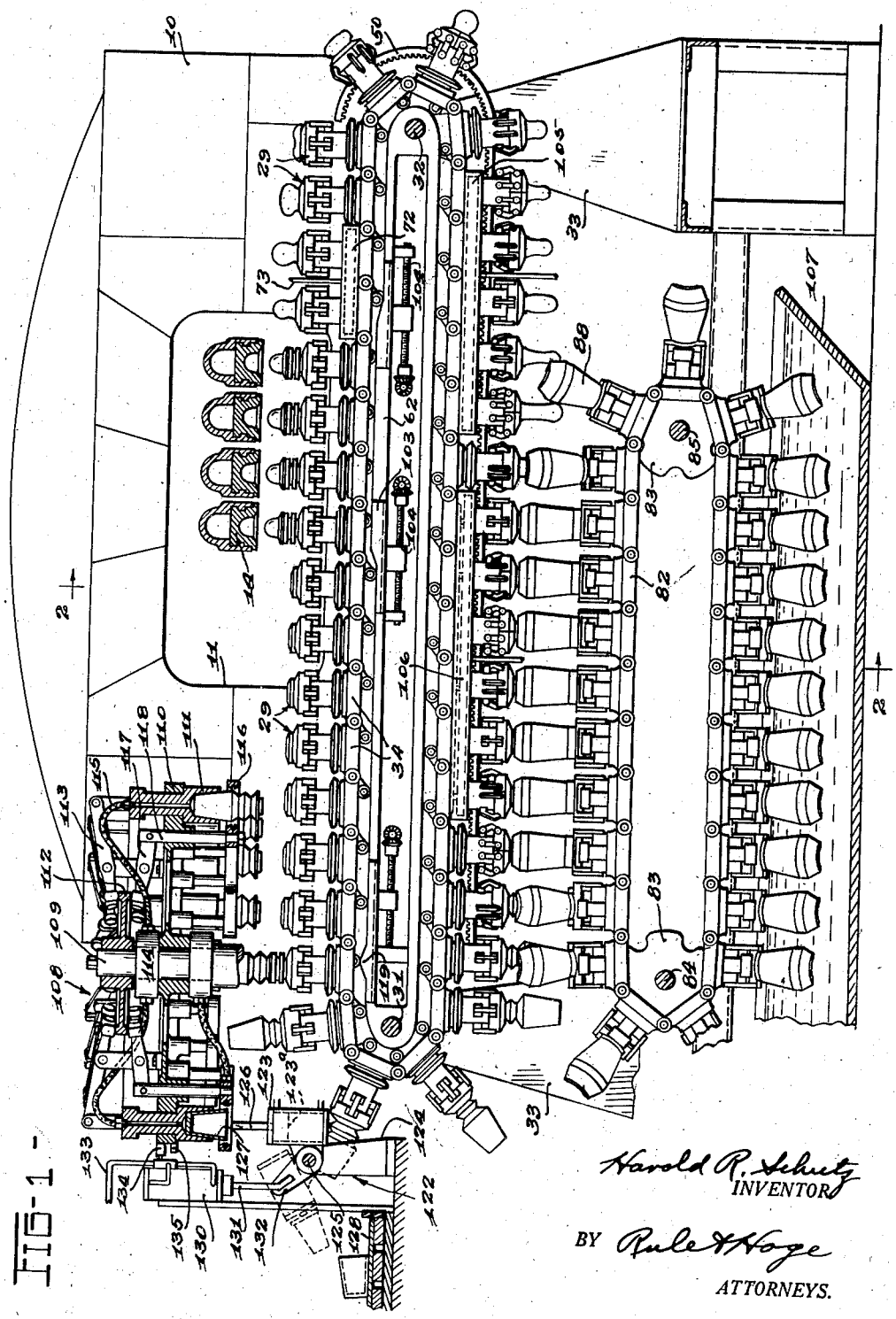

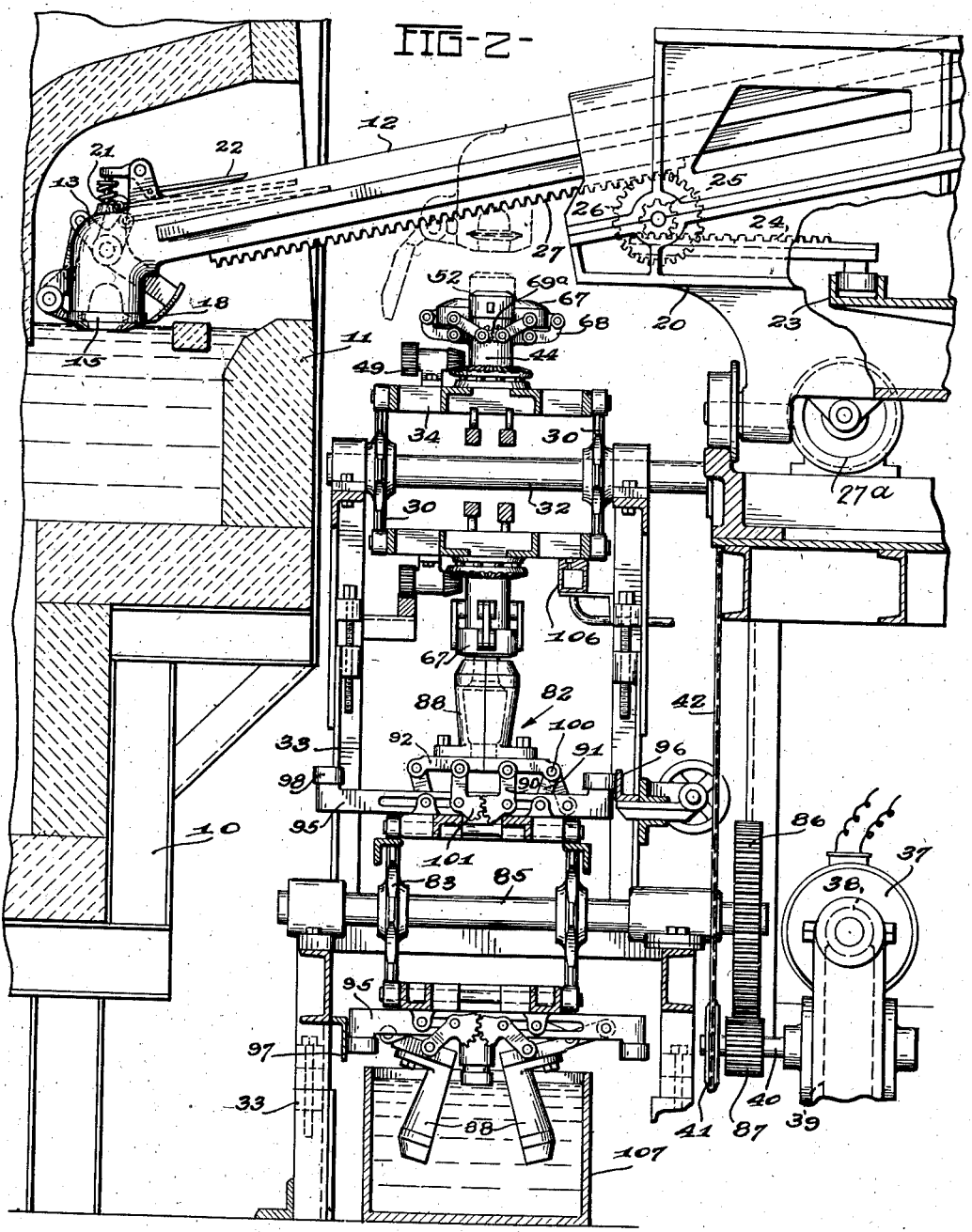

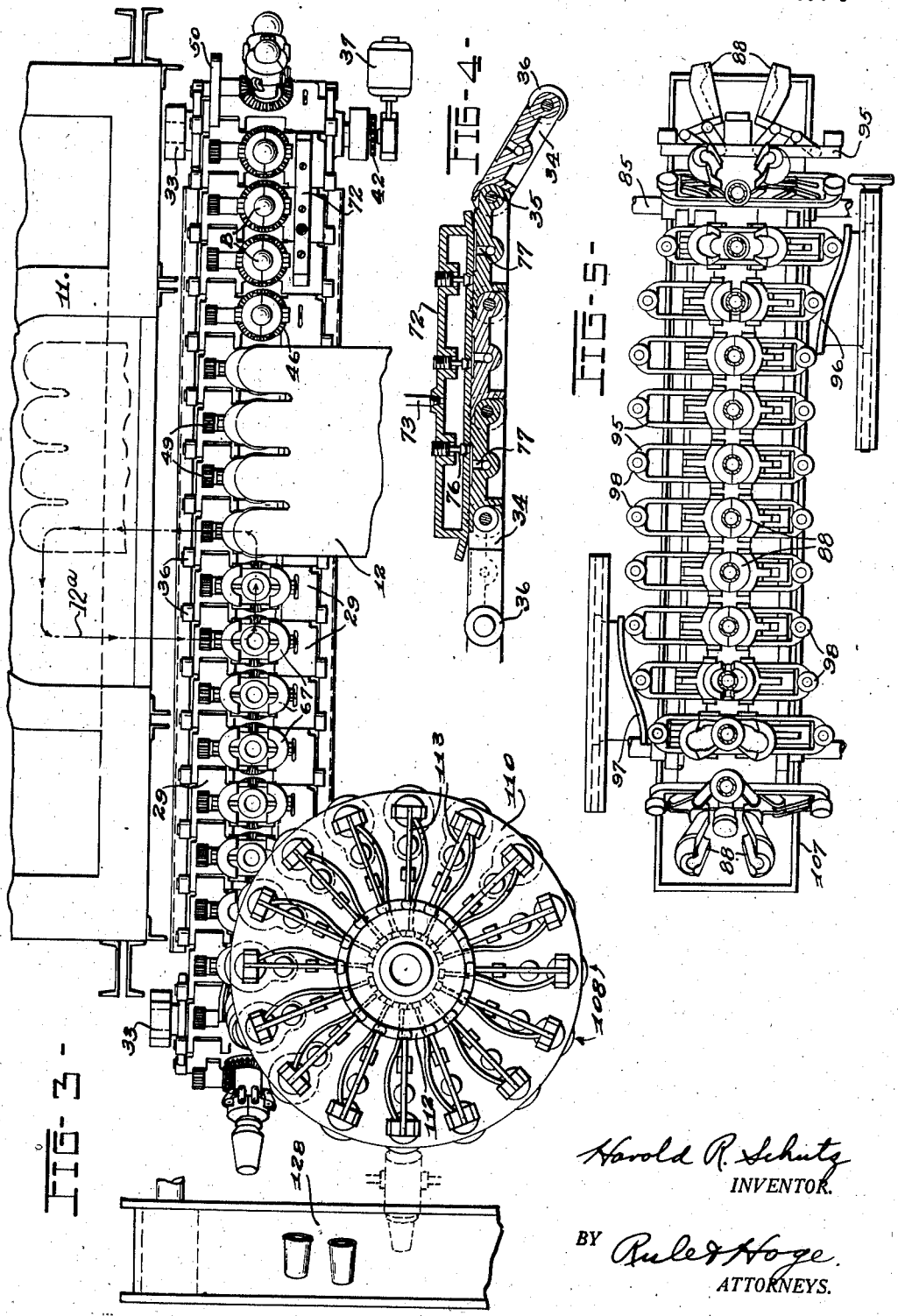

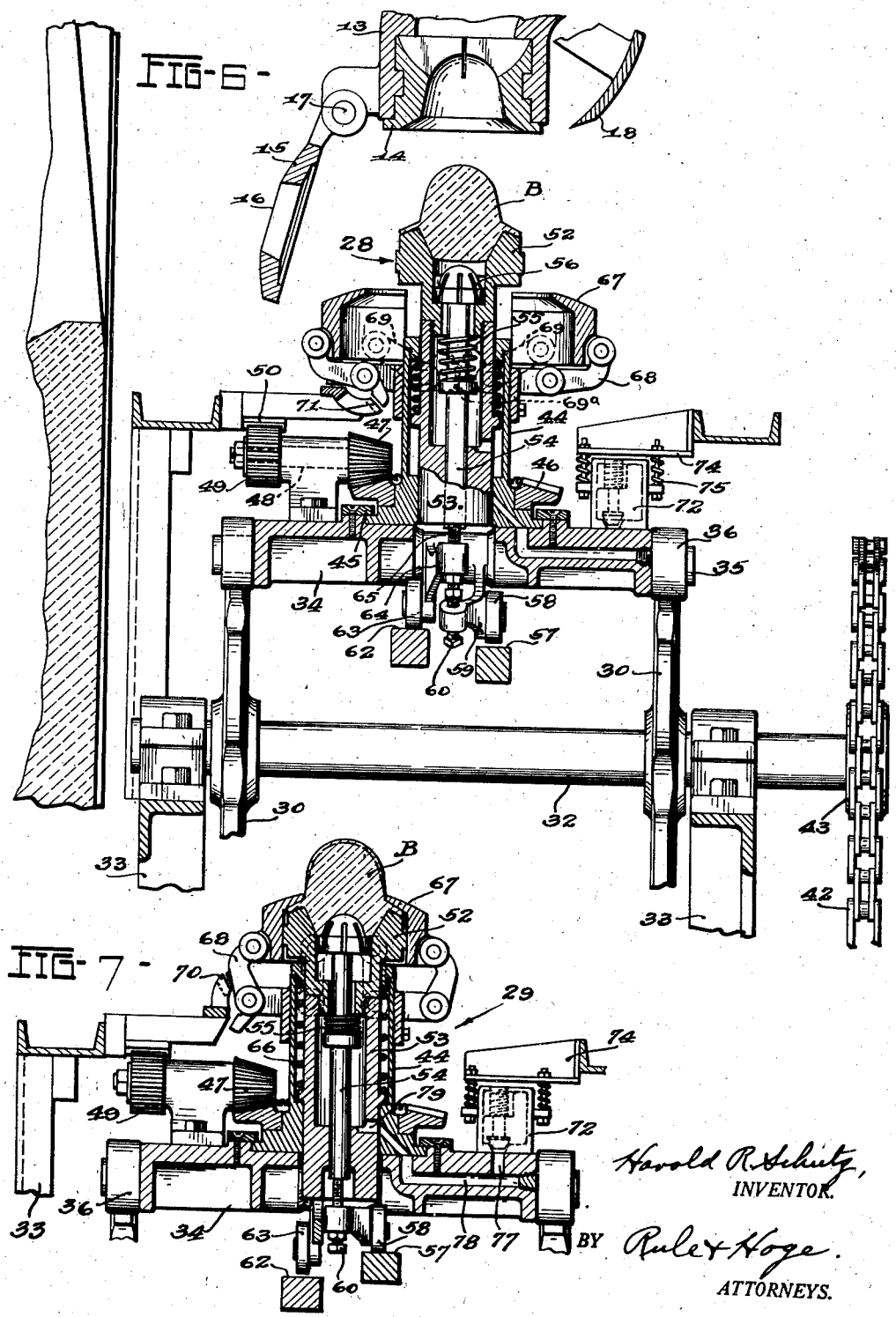

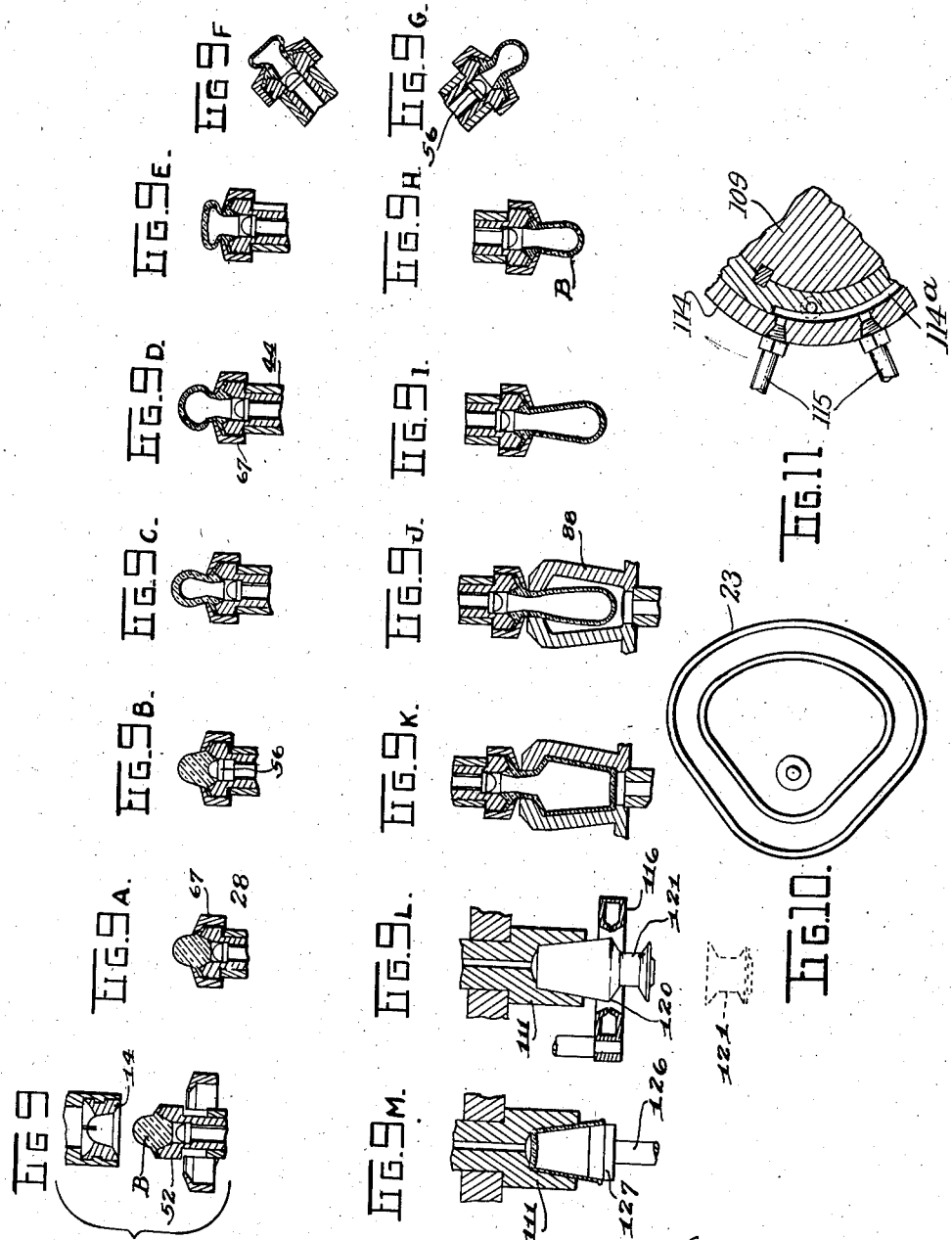

Patented Apr. 21, 1942

2,280,268

UNITED STATES PATENT OFFICE 2,280,268

APPARATUS FOR MAKING HOLLOW GLASS ARTICLES

Harold R. Schutz, Toledo, Ohio, assignor to Libbey Glass Company, a corporation of Ohio Application July 9, 1938, Serial No. 218,484

15 Claims. (Cl. 49—5)

My invention relates to apparatus for making hollow glassware such as tumblers, bottles, jars and the like. In its preferred form the invention is embodied in apparatus of the type in which charges of molten glass are introduced by suction into a blank mold carried by a ram which is periodically projected into a furnace tank or the like containing a supply of molten glass to permit the mold to gather its charge. The blanks thus formed are transferred to spindles or holders to which air under pressure is supplied for blowing or expanding the blanks to hollow form, the blanks being developed in the open and then introduced into finishing molds in which they are blown to finished form, means being provided to burn-off or sever the moil after the articles have been blown in the finishing molds.

An object of my invention is to provide a novel form of such apparatus which is of simple construction and at the same time adapted to have a large output. More specifically, an object of the invention is to provide an apparatus of the type indicated in which the blanks are transferred from the blank mold or molds to blank holders or spindles which are carried on a horizontally disposed endless conveyor, the blanks while supported on the spindles being first developed in the open and then blown in finishing molds carried on a separate endless conveyor driven in synchronism with the spindle conveyor.

A further object of the invention is to provide a new and improved burn-off mechanism for burning off or severing the moil, novel means for transferring the articles to the burn-off mechanism and novel mechanism for transferring articles from the burn-off mechanism to a conveyor or the like.

Other objects of the invention will appear hereinafter.

Referring to the accompanying drawings:

Fig. 1 is a part sectional elevation of an apparatus embodying the principles of my invention;

Fig. 2 is a sectional elevation of the same, the section being taken substantially at the line 2—2 on Fig. 1;

Fig. 3 is a plan view of the apparatus;

Fig. 4 is a detail view in sectional elevation, showing a pressure chamber mounted over the spindle conveyor for supplying puffs of air for developing the blanks;

Fig. 5 is a plan view of the finishing molds and their carrier;

Fig. 6 is a sectional elevation of a blank receiving unit and associated parts, the spindle being in its projected position.

Fig. 7 is a similar view with the spindle retracted;

Fig. 8 is a sectional elevation showing a blank receiving unit and a cooperating finishing mold unit;

Fig. 9 is a diagrammatic view showing a blank just as it has been dropped onto a spindle; and Figs. 9A to 9M are diagrammatic views showing the successive steps in the development of the blank.

Fig. 10 is a plan view of a cam for reciprocating the ram; and

Fig. 11 is a detail view showing a suction chamber.

Referring particularly to Figs. 1, 2 and 3, the mold charges of glass are supplied from a tank or furnace 10 provided with a forehearth 11. A gathering ram 12 is formed with a multiple head 13 in which is mounted a series of blank molds 14 which may be of conventional form. The bottom plates 15 of the molds (Fig. 6), provided each with an opening 16, are carried on a horizontal rock shaft 17 journaled in brackets on the head 13. A knife 18 pivoted to the head 13 is adapted to shear across the bottom plates 15 for severing the charges of glass in the usual manner.

The ram 12 is mounted on a carriage 20 for reciprocation lengthwise and is projected in a downwardly inclined direction for bringing the blank molds into charge gathering position as shown in Fig. 2. Vacuum is then applied as usual within the molds for gathering the charges of glass by suction. The application of vacuum is under the control of a valve 21 which may be actuated by mechanism (not shown) operating periodically through a rod 22. After the molds have received their charge, the ram is withdrawn and the knife 18 is operated to shear across the bottom plates 15 and sever the charges. The reciprocating movements of the ram may be effected by means of a cam 23 (Figs. 2 and 10) operating through a rack 24, and pinions 25 and 26 engaging respectively the rack 24 and a rack 27 on the ram. The cam 23 may be mounted for horizontal rotation on the carriage 20 and shaped to give the desired reciprocating movements to the ram. The path of movement of the ram and a mold thereon is indicated by the broken line 12ª, Fig. 3, from which it will be seen that the ram is projected forward and downward into the glass, then travels horizontally to the left while the molds are in dip, then withdraws in a substantially straight line to bring the charged molds to the discharging position, and then travels horizontally with the spindle conveyor while the blanks are being transferred to the spindles.

The horizontal movements of the ram which take place while it is in dip and while in its fully retracted position, may be effected by any approved or conventional means. As herein shown an air motor 27ª (Fig. 2), preferably a piston motor, serves this purpose.

Blank receiving units 29 are connected to form an endless chain or carrier extending horizontally beneath the ram and traveling continuously. Spindles 28, individual to and forming part of the blank receiving units, are brought in succession by the travel of the carrier, into blank receiving positions directly beneath the head of the ram when the latter is retracted to its discharging position, shown in dotted lines (Fig. 2), so that when the bottom plates 15 are swung down, the blanks are dropped onto the spindles directly therebeneath.

The endless carrier for the spindles is trained over sprocket wheels 30 mounted on horizontal shafts 31 and 32 journaled in a framework 33. Each of the blank receiving units 29 comprises a base plate 34. Said plates are pivotatlly connected by pivot pins or studs 35 on each plate. Bearing lugs or rolls 36 on said pins are arranged to run on the sprocket wheels 30. The spindle conveyor is driven continuously by an electric motor 37 (Fig. 2) operatively connected to the conveyor through speed reduction gearing comprising a worm 38 on the motor shaft and a worm gear 39 on a shaft 40, the latter having driving connections with the shaft 32 through a sprocket gear 41, chain 42 and sprocket wheel 43 (Fig. 6).

Each blank receiving unit 29 comprises a spindle 28 mounted to rotate on the base plate 34, said spindle including a tubular member or sleeve 44 formed with a flanged base which rests on the base plate 34 and engages beneath a bearing ring 45 secured to the base plate. A bevel pinion 46 keyed to the member 44 runs in mesh with a pinion 47 on a shaft 48 journaled in a bracket bolted to the base 34. A pinion 49 on the shaft 48 is adapted to be driven periodically by a stationary rack 50 with which it engages during a certain portion of its travel with the spindle conveyor, thereby periodically rotating the spindle as hereinafter described.

The spindle comprises a head 52 at the outer end of a shank 53 which is mounted for endwise movement within the sleeve 44. A plunger 54 is mounted within the shank 53 and is movable relative thereto in the direction of its length. The plunger is at certain times held retracted by a coil spring 55 as shown in Fig. 6 but may be projected as shown in Fig. 7 so that the head 56 of the plunger forms an initial blow opening in the blank. The means for projecting the plunger comprises a stationary cam 57 on which runs a roll 58 carried on a rock arm 59 which has a pivotal mounting on the base 34. The arm 59 carries a stop screw 60 which bears against the lower end of the plunger 54, said stop screw being adjustable to vary the projected position of the plunger head.

The spindle head 52 is periodically projected to the dotted line position (Fig. 2) for receiving a blank. The means for projecting the spindle comprises a cam 62 on which runs a roll 63 carried by a rock arm 64 journaled on the base 34, said rock arm carrying an adjustable stop screw 65 which bears against the lower end of the spindle shank 53 at a point forward of the plunger 54. The spindle is retracted by a coil spring 66.

When a blank B has been dropped onto the spindle it is secured thereto by a pair of gripping jaws 67. Each of the jaws is carried on a pair of parallel links 68 and 69 pivotally supported on the casing 44, permitting the jaws to swing from their lowered or open position (Fig. 6) upwardly to the blank gripping position (Fig. 7). A stationary cam 70 (Fig. 7) operates to move the jaws upwardly to their clamping position. The jaws are retracted by means of a stationary cam 71 (Fig. 6). The two jaws are interconnected for simultaneous operation by intermeshing gear segments 69ª which may be formed integrally with the links 69.

Air for blowing and expanding the blanks in the open is supplied from a chamber or box 72 connected by a pipe 73 to a source of air under pressure. The box 72 is mounted on a stationary bracket 74 (Fig. 6) directly over the path of the base plates 34 which carry the spindles, said box being held by means of springs 75, with a yielding pressure on said plates which travel thereunder. The air box carries a series of throttle valves 76 (see Fig. 4) controlling ports in the floor of said box, which ports are brought in succession into register with ports 77 in the base plates 34. The ports 77 communicate with passages 78 (Fig. 7) extending to the spindle shank 53 and when the spindle is in its projected position (Fig. 7), communicate with a port 79 in said shank. The port 79 is open through the hollow shank and admits the air under pressure to the blank. As each base plate 34 travels beneath the air box 72, the ports 77 are brought into register in succession with the series of valves 76 for supplying puffs of air to the blank for developing it in a conventional manner.

The finishing mold group comprises a plurality of units 82 pivotally connected in the form of an endless chain conveyor running over sprocket wheels 83 on shafts 84 and 85 journaled in bearings on the frame 33. The shaft 85, which forms the drive shaft for the finishing mold conveyor, has keyed thereto a gear wheel 86 which runs in mesh with a pinion 87 on the shaft 40. The finishing mold conveyor is thereby driven in synchronism with the spindle conveyor so that the finishing molds 88 may enclose the blanks or parisons and travel therewith during the blowing of the parisons in the finishing molds as hereinafter described.

Each finishing mold unit 82 (see Figs. 2 and 8) comprises a finishing mold 88 consisting of a pair of partible mold sections. Each mold section is removably mounted on a carrier plate 92 to which is pivoted a pair of links 90 and 91. The lower ends of the links 90 and 91 are connected by pivots 93 to the base plate 94 of the finishing mold unit. When the finishing mold is closed around a parison, as shown in Fig. 2 and in full lines in Fig. 8, the links 90 and 91 are approximately vertical, but somewhat upwardly and outwardly divergent. The finishing mold is opened and closed by means of a slide frame 95 actuated by cams 96 and 97 (see Fig. 5) which periodically engage cam rolls 98 at opposite ends of the slide frame. A link 99 connects the slide frame with a pivot pin 100 at the upper end of one of the links 91. Intermeshing segmental racks 101 formed on the links 90 transmit movement from one mold section to the other so that said sections swing in unison. It will be seen that with this construction movement of the slide frame 95 to the left (Fig. 8) by the cam 96 operates to swing the mold sections 88 from the open position shown in broken lines to the closed position shown in full lines. When the slide frame is moved in the opposite direction by the cam 97 the mold sections are separated.

By reference to Fig. 1, it will be seen that the cam 62 for projecting the spindles is so positioned that the spindles are held thereby in their elevated position while directly beneath the blank molds 14, at which time the blanks are dropped onto the spindles. The cam 62 comprises end sections 103 individually adjustable lengthwise by adjusting means comprising screw shafts 104 which may be geared to hand wheels or the like for making such adjustments. The rack 50 which controls the rotation of the spindles is so positioned that the rotation of each spindle takes place during the inverting movement of the spindle and preferably continues until the blank has been developed and blown in the finishing mold. After a blank has been inverted it is further developed in the open, air under pressure being supplied for this purpose by a pressure chamber or box 105 which may be similar in construction to the box 72. After the blank has been thus developed in the open, it is enclosed in a finishing mold 88 and while being rotated therein is blown to finished form by air supplied from a pressure chamber 106. The finishing molds 88, which are preferably paste molds, travel through a tank 107 containing water for cooling the molds. If desired, iron molds may be substituted for the paste molds 88, in which event the rack 50 is shortened so that there is no rotation of the blank while enclosed within the mold.

After the blown article leaves the finishing mold it travels upward around the end of the spindle conveyor frame to a burn-off apparatus 108, and is at the same time inverted. This apparatus comprises a vertical stationary column 109 on which is mounted a carriage 110 rotated continuously in synchronism with the movements of the spindle conveyor. An annular series of inverted suction cups or chucks 111 are mounted for individual movement up and down on the carriage. Such up and down movements are imparted to the chucks by a stationary cam track 112 operating through levers 113 individual to the chucks 111. Suction for holding the blanks is supplied through a suction chamber 114a (Fig. 11), the outer wall of which is formed by a ring 114 fixed to the table 110 so that it rotates with the carriage, said chamber communicating with the chucks through flexible pipes 115.

Burners 116 (Figs. 1 and 9) individual to the chucks are mounted for up and down movement on the carriage 110, said burners being located directly beneath and in line with the chucks. The burners are movable up and down with the suction cups under the control of the cam 112 operating through levers 117 and vertical rods 118, the latter mounted for up and down movement on the carriage.

Each blown blank after it is released from the finishing mold and has been inverted, is carried by its spindle to a position directly beneath and in register with one of the chucks 111. The chuck is then lowered over the blank under the control of the cam 112. At the same time the blank is released from its spindle by means of a cam 119 operating to separate the jaws 67. The blank is now held by suction in the chuck 111 and as it rotates with the burner carriage 110 the burner 116 directs an annular flame against the shoulder 120 of the blank so that the moil 121 is burned off and drops away.

A combined transfer mechanism and shaping device 122 (Fig. 1) is then brought into operation to shape the lip of the blown article and transfer the article to a conveyor or other support. Such mechanism includes an air operated piston motor 123 mounted by a rock shaft 125 to swing on a supporting frame 124. The motor piston rod 126 carries a plug or die 127 (Figs. 1 and 9M) which may be frusto-conical in shape and which is projected upward by the motor 123 into the open end of the blown article after the moil has been burned off, thereby reshaping the end of the plastic article and removing any irregularities resulting from the burn-off or transfer operations. The motor piston 123a is now retracted so that the blown article is carried downward out of the chuck 111 to a position to clear the burner 116. It will be understood that the pipe 115 (Fig. 11), which connects with said chuck, passes beyond the vacuum chamber so that the suction within the cup 111 is released before the article is withdrawn. The piston motor 123 is now swung about the axis of the shaft 125, from the full line to the broken line position (Fig. 1) to discharge the blown article onto a conveyor or other support 128. The means for swinging the motor 123 may comprise a piston motor 130, the piston rod 131 of which is connected to a rock arm 132 on the rock shaft 125. Air for operating the motor 130 may be supplied thereto through a pipe 133, the air supply being under the control of valves actuated by a cam or cams 134 on the carriage 110. Air for operating the piston motor 123 may in like manner be controlled by a cam 135 on the carriage 110.

The successive steps in the development of the blank are illustrated in Figs. 9 to 9M, inclusive. In Fig. 9 the blank B has just been dropped from the mold onto the spindle head 52. In Fig. 9A the clamping jaws 67 have been swung into position to grip the blank. In Fig. 9B the plunger 56 has been projected to form an initial blow opening in the blank. In Figs. 9C to 9I successive steps in the development of the blank in the open are illustrated. In Fig. 9J the finishing mold 88 has closed about the blank. In Fig. 9K the blank has been blown to its final form. In Fig. 9L the blown blank has been transferred to the chuck 111 and the burner 116 brought into operation. In Fig. 9M the article is shown supported on the shaping die 127 by which the lip of the blown article has been reshaped prior to the withdrawal of the article from the chuck.

Modifications may be resorted to within the spirit and scope of the appended claims.

I claim:

1. Apparatus for forming hollow glass articles comprising a chain of blank-holding spindles, means for causing the spindles to travel in a closed path comprising a horizontal section through which the spindles move while held in an upright position and a horizontal straight line section through which they travel in an inverted position, means for attaching individual, segregated blanks to said spindles while the spindles are in upright position, means for blowing and developing the blanks in the open, finishing molds, means for closing the finishing molds around the blanks and for causing the finishing molds to travel with the inverted spindles, and means for blowing the blanks in the finishing molds.

2. Apparatus for forming hollow glass articles comprising a series of spindles, carriers for the spindles connected to form an endless chain, horizontally spaced gears over which said chain is trained, means for driving said chain and causing the spindles to travel in a closed path in which the spindles are held in an upright position and advance horizontally in one direction and in which the spindles are inverted and travel horizontally while inverted in the opposite direction, means for attaching individual, segregated blanks to the upright spindles, means for blowing the blanks to the form of hollow parisons, finishing molds arranged to enclose the blanks while the latter are supported on and depending from the inverted spindles, means to cause the finishing molds to travel with the parisons through a predetermined distance, and means for blowing the parisons in the finishing molds.

3. Apparatus for forming hollow glass articles comprising a series of spindles, carriers for the spindles connected to form an endless chain, horizontally spaced gears over which said chain is trained, means for driving said chain and causing the spindles to travel in a closed path in which the spindles are held in an upright position and advance horizontally in one direction and in which the spindles are inverted and travel horizontally while inverted in the opposite direction, means for attaching individual, segregated blanks to the upright spindles, means for blowing the blanks to the form of hollow parisons, a series of finishing molds, an endless carrier for the finishing molds arranged to permit the latter to travel with the inverted spindles, means for driving the finishing mold carrier in synchronism with the travel of the spindles, and means for blowing the parisons in the finishing molds.

4. Apparatus for forming hollow glass articles comprising a series of blank-receiving units connected to form an endless chain, gears over which said chain is trained, means for driving said chain and gears, each said unit comprising a spindle and a carrier on which the spindle is mounted, said spindles being carried in succession past a charge-receiving station, a stationary cam, means cooperating therewith for projecting each spindle outwardly from its carrier to receive a blank of molten glass as the spindle passes said station, gripping jaws carried with each spindle, and means for causing said jaws to grip a blank and hold it on the spindle.

5. Apparatus for forming hollow glass articles comprising a series of blank-receiving units connected to form an endless chain, gears over which said chain is trained, means for driving said chain and gears, each said unit comprising a spindle and a carrier on which the spindle is mounted, said spindles being carried in succession past a charge-receiving station, a stationary cam, means cooperating therewith for projecting each spindle outwardly from its carrier to receive a blank of molten glass as the spindle passes said station, said spindles being hollow, plungers mounted therein, a second stationary cam, means cooperating therewith to project the plungers for forming initial blow openings in the blanks, and means for blowing the blanks while supported on the spindles.

6. Apparatus for forming hollow glass articles comprising blank receiving units connected to form an endless chain, gears over which said chain is trained, means for driving said gears and chain, each said unit comprising a hollow spindle and a carrier therefor, means for attaching segregated solid blanks individually to the spindles, plungers mounted for lengthwise movement within the spindles and operable to form initial blow openings in the blanks, means for intermittently rotating the spindles comprising a stationary rack extending lengthwise of said chain, and trains of gears individual to said holders and forming driving connections between the rack and the spindles for rotating the latter.

7. Apparatus for forming hollow glass articles comprising blank-receiving units connected to form an endless chain, means for driving said chain and causing said units to travel in an endless path, each said unit comprising a hollow spindle, means cooperating with each spindle for holding a blank of glass, plungers mounted for lengthwise movement within the spindles and operable to form initial blow openings in the blanks, means for blowing the blanks to hollow form comprising an air pressure chamber positioned adjacent the path of movement of said units, and means for establishing communication between said chamber and each of the hollow spindles in succession and thereby supplying air under pressure for blowing the blanks.

8. Apparatus for forming hollow glass articles comprising blank-receiving units connected to form an endless chain, means for driving said chain and causing said units to travel in an endless path, each said unit comprising a hollow spindle, means cooperating with each spindle for holding a blank of glass, plungers mounted for lengthwise movement within the spindles and operable to form initial blow openings in the blanks, means for blowing the blanks to hollow form comprising an air pressure chamber positioned adjacent the path of movement of said units, said chamber provided with a plurality of ports, and means for opening said ports singly and in succession to each hollow spindle and thereby supplying puffs of air under pressure through the spindle to the blank for developing the latter.

9. Apparatus for forming hollow glass articles comprising blank-receiving units connected to form an endless chain, means for driving said chain and causing said units to travel in an endless path, each said unit comprising a spindle and a carrier on which the spindle is mounted, gripping jaws cooperating with each spindle for holding the blank on the spindle, and stationary cams arranged to operate said jaws.

10. Apparatus for forming hollow glass articles comprising mold units connected to form an endless chain, each of said units comprising a mold including separable sections and a carrier on which the mold sections are mounted, means for driving said chain and causing the units to travel in a closed path, stationary cams located at opposite sides of the path of travel of the said units, slide frames mounted on and individual to said units, each said frame arranged to be moved alternately in opposite directions respectively by said cams, and operating connections between said slide frame and the mold sections for opening and closing the molds.

11. Apparatus for forming hollow glass articles comprising a series of spindles, carriers on which the spindles are mounted, said carriers being connected in an endless chain formation, means for causing the chain of carriers to travel in a closed path including a straight line portion, gripping devices individual to and carried by the spindles, means for dropping individual charges on the spindles, means for actuating the gripping devices singly and in succession and thereby attaching the segregated charges individually to the spindles while the latter are traveling in said straight line and holding the charges on said spindles, and means for developing the charges in succession to form hollow articles during their travel with said carriers.

12. Apparatus for forming hollow glass articles comprising a series of spindles, carriers on which the spindles are mounted, said carriers being connected in an endless chain formation, means for causing the chain of carriers to travel in a closed path including a straight line portion, gripping devices individual to and carried by the spindles, means for dropping individual charges on the spindles, means for actuating the gripping devices in succession and thereby attaching the segregated charges individually to the spindles while the latter are traveling in said straight line, means for expanding and developing the charges in the open, finishing molds, means for closing the finishing molds around the said developed charges and causing them to travel therewith along a predetermined portion of said closed path, and means for blowing the charges in the finishing molds.

13. Apparatus for forming hollow glass articles comprising a series of charge-holding spindles, means connecting said spindles in an endless chain formation, a series of finishing molds, means connecting the finishing molds in endless chain formation, means for driving the spindles and finishing molds in synchronism and causing them to travel in closed paths in which the finishing molds advance with the spindles a predetermined distance, gripping devices individual to and carried by the spindles, means for dropping individual charges on the spindles, means for actuating the gripping devices in succession and thereby attaching the charges of glass individually to the spindles, and means for blowing the charges within the finishing molds.

14. Apparatus for forming hollow glass articles comprising a series of blank holders, means connecting said holders in endless chain formation, a pair of gears over which the chain is trained, said gears mounted for rotation about horizontally spaced parallel axes, gripping devices individual to and carried by said holders, means for dropping individual blanks of glass on the holders, means for actuating the gripping devices in succession and thereby attaching the blanks of glass individually to said holders, and means for blowing and developing the blanks to form hollow finished articles.

15. Apparatus for forming hollow glass articles comprising a series of holders for charges of glass, means connecting said holders in endless chain formation, a pair of gears over which the chain is trained, said gears mounted for rotation about horizontally spaced parallel axes, gripping devices individual to and carried by said holders, means for dropping individual charges of glass on the holder, means for actuating the gripping devices singly and in succession and thereby attaching the charges of glass individually to said holders, a series of finishing molds, means connecting them in endless chain formation, gears over which the chain of finishing molds is trained, said last mentioned gears mounted for rotation about horizontally spaced horizontal axes, means for driving said chains and causing the finishing molds to advance with the holders through a predetermined distance, and means for blowing the charges of glass within the finishing molds while supported on the said holders.

HAROLD R. SCHUTZ.